US008035550B2

(12) United States Patent
Holly et al.

(10) Patent No.: US 8,035,550 B2
(45) Date of Patent: Oct. 11, 2011

(54) UNBALANCED NON-LINEAR RADAR (75) Inventors: Sandor Holly, Woodland Hills, CA (US); Nicholas Koumvakalis, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 197 days.

(21) Appl. No.: 12/264,153

(22) Filed: Nov. 3, 2008

(65) Prior Publication Data
US 2010/0001899 A1    Jan. 7, 2010

Related U.S. Application Data (60) Provisional application No. 61/078,009, filed on Jul. 3, 2008.

(51) Int. Cl.
G01S 7/42     (2006.01)
G01S 13/00    (2006.01)
G01S 13/08    (2006.01)

(52) U.S. Cl. ............ 342/175; 342/13; 342/27; 342/128; 342/129

(58) Field of Classification Search ............... 342/13–20, 342/128, 129, 175
See application file for complete search history.

(56) References Cited

U.S. PATENT DOCUMENTS

| | | | |
|---|---|---|---|
| 2,632,058 A | 11/1947 | Gray | |
| 3,028,596 A * | 4/1962 | McGillen et al. | 342/351 |
| 3,348,093 A | 10/1967 | Holly | |
| 3,405,722 A * | 10/1968 | Carruthers et al. | 137/2 |
| 3,705,956 A | 12/1972 | Edertouzos | |
| 3,707,672 A * | 12/1972 | Miller et al. | 324/239 |
| 3,852,755 A | 12/1974 | Works et al. | |
| 3,919,638 A | 11/1975 | Belden, Jr. | |
| 3,939,475 A * | 2/1976 | Lewis | 342/129 |
| 4,053,891 A * | 10/1977 | Opitz | 342/193 |
| 4,264,814 A | 4/1981 | Freund et al. | |
| 4,303,910 A * | 12/1981 | McCann | 340/572.2 |
| 4,435,710 A * | 3/1984 | Powell | 342/16 |
| 4,546,356 A * | 10/1985 | Petitjean et al. | 342/16 |
| 4,600,559 A | 7/1986 | Hiatt | |
| 4,634,968 A | 1/1987 | Aslan | |
| 4,638,813 A | 1/1987 | Turner | |
| 4,646,098 A * | 2/1987 | Mattern et al. | 342/14 |
| 4,806,747 A | 2/1989 | Dunavan et al. | |

(Continued)

FOREIGN PATENT DOCUMENTS
GB    2121612 A    12/1983
(Continued)

OTHER PUBLICATIONS

U.S. Appl. No. 12/022,891, filed Jan. 30, 2008, Sandor Holly et al.

(Continued)

Primary Examiner — Thomas Tarcza
Assistant Examiner — Peter Bythrow
(74) Attorney, Agent, or Firm — Haynes and Boone, LLP (57) ABSTRACT

A transmitter system can have a higher power transmitter and a lower power that are configured to transmit a pair of unbalanced radio frequency beams to a target so as to produce a difference frequency in the target. The difference frequency can disrupt operation of a device, such as a weapon. The difference frequency can provide a radar return. The use of a higher power transmitter and a lower power transmitter reduces costs, size, and weight as compared to the use of two higher power transmitters.

29 Claims, 9 Drawing Sheets

U.S. PATENT DOCUMENTS

| | | | |
|---|---|---|---|
| 4,942,291 A | | 7/1990 | Dietrich |
| 5,030,962 A | * | 7/1991 | Rees .................. 343/700 MS |
| 5,073,782 A | * | 12/1991 | Huguenin et al. ............ 342/179 |
| 5,103,083 A | | 4/1992 | Reed et al. |
| 5,177,445 A | * | 1/1993 | Cross ............................ 324/637 |
| 5,191,343 A | * | 3/1993 | Danzer et al. ................ 342/21 |
| 5,227,800 A | * | 7/1993 | Huguenin et al. ............ 342/179 |
| 5,233,263 A | | 8/1993 | Cronin et al. |
| 5,308,439 A | | 5/1994 | Cronin et al. |
| 5,420,595 A | | 5/1995 | Zhang et al. |
| 5,483,060 A | | 1/1996 | Sugiura et al. |
| 5,756,999 A | | 5/1998 | Parrish et al. |
| 5,856,803 A | | 1/1999 | Pevler |
| 5,939,721 A | | 8/1999 | Jacobsen et al. |
| 6,049,301 A | * | 4/2000 | Weagant ........................ 342/13 |
| 6,057,765 A | * | 5/2000 | Jones et al. ................ 340/572.2 |
| 6,163,259 A | * | 12/2000 | Barsumian et al. ........ 340/572.2 |
| 6,480,141 B1 | * | 11/2002 | Toth et al. ........................ 342/22 |
| 6,492,957 B2 | | 12/2002 | Carillo, Jr. et al. |
| 6,605,808 B2 | | 8/2003 | Michan et al. |
| 6,765,527 B2 | * | 7/2004 | Jablonski et al. ............. 342/193 |
| 6,864,825 B2 | * | 3/2005 | Holly ............................ 342/13 |
| 6,897,777 B2 | * | 5/2005 | Holmes et al. ............. 340/572.2 |
| 6,943,742 B2 | | 9/2005 | Holly |
| 6,944,486 B2 | | 9/2005 | Braig et al. |
| 6,950,076 B2 | * | 9/2005 | Holly ............................ 343/820 |
| 6,999,041 B2 | * | 2/2006 | Holly ............................ 343/820 |
| 7,009,575 B2 | * | 3/2006 | Holly et al. ................... 343/820 |
| 7,122,813 B2 | | 10/2006 | Linfield et al. |
| 7,142,147 B2 | * | 11/2006 | Holly ............................ 342/13 |
| 7,265,331 B2 | * | 9/2007 | Muenter et al. ............. 250/208.2 |
| 7,450,052 B2 | * | 11/2008 | Hausner et al. ............... 342/22 |
| 7,473,898 B2 | * | 1/2009 | Holly et al. ................... 250/343 |
| 7,512,511 B1 | | 3/2009 | Schultz et al. ................ 702/127 |
| 7,626,400 B2 | * | 12/2009 | Holbrook et al. ............. 324/642 |
| 7,639,178 B1 | | 12/2009 | Mulbrook et al. ............. 342/146 |
| 2002/0075189 A1 | | 6/2002 | Carillo, Jr. et al. |
| 2003/0034444 A1 | * | 2/2003 | Chadwick et al. ............. 250/225 |
| 2004/0008149 A1 | | 1/2004 | Killen et al. |
| 2004/0095243 A1 | * | 5/2004 | Holmes et al. ............. 340/572.2 |
| 2005/0088358 A1 | * | 4/2005 | Larry et al. .................... 343/833 |
| 2005/0179606 A1 | * | 8/2005 | Holly ............................ 343/753 |
| 2005/0179611 A1 | * | 8/2005 | Holly ............................ 343/820 |
| 2005/0179612 A1 | * | 8/2005 | Holly et al. ................... 343/853 |
| 2006/0082488 A1 | * | 4/2006 | Keller, III ..................... 342/22 |
| 2006/0202123 A1 | | 9/2006 | Villermoz et al. |
| 2007/0013577 A1 | * | 1/2007 | Schnitzer et al. ............... 342/90 |
| 2008/0017813 A1 | * | 1/2008 | Vetrovec et al. ........... 250/504 R |
| 2008/0291108 A1 | * | 11/2008 | Holly et al. ................... 343/814 |

FOREIGN PATENT DOCUMENTS

| | | |
|---|---|---|
| JP | 01101006 | 4/1989 |
| JP | 2006-211637 | 8/2006 |
| WO | 03/019738 A1 | 3/2003 |
| WO | 2005/093904 A1 | 10/2005 |
| WO | 2006/088802 A2 | 8/2006 |

OTHER PUBLICATIONS

U.S. Appl. No. 12/264,128, filed Nov. 3, 2008, Sandor Holly et al.
U.S. Appl. No. 12/264,152, filed Nov. 3, 2008, Sandor Holly et al.
PCT/US2006/005057; Feb. 14, 2006; The Boeing Company.
PCT/US2008/061106; Apr. 22, 2008; The Boeing Company.
Maier, W.B., Freund, S. M., Holland, R.F. & Beattie, Photolytic separation of D from H. in cryogenic solutions of formaldehyde 69, 1961 (1978).
J. T. Kindt and C. A. Schmuttenmaer. Far-infrared dielectric properties of polar liquids probed by femtosecond THz pulse spectroscopy. Journal of Physical Chemistry, 100:10373-10379, 1996.
Park et al., A Novel lateral field emitter triode with Insitu vacuum encapulation, international electron devices meeting, 1996.
Park et al., Lateral field emission diodes using SIMOX wafer, IEEE transactions on electron devices, vol. 44, No. 6, Jun. 1997.
Milanovic et al., Micromachining Technology for Lateral Field Emission Devices, IEEE Transactions on Electron Devices, vol. 48, No. 1, Jan. 2001.
Peter H. Siegel, Terahertz Technology, IEEE Transactions on Microwave Theory and Techniques, Mar. 2002, pp. 910-928, vol. 50, No. 3.
Peter H. Siegel, THz Technology; An Overview, International Journal of High Speed Electronics and Systems, 2003, pp. 1-44, vol. 13, No. 2, World Scientific Publishing Company, USA.
Raman et al., A W-Band Dielectric-Lens-Based Integrated Monopulse Radar Receiver, IEEE Transactions on Microwave Theory and Techniques, Dec. 1998, pp. 2308-2316, vol. 46, No. 12.
Filipovic et al., Off-Axis Properties of Silicon and Quartez dielectric lens Antennas, IEEE Transcations on Antennas and Progagation, May 1997, pp. 760-766, vol. 45, No. 5.

* cited by examiner

UNBALANCED NON-LINEAR RADAR

PRIORITY CLAIM

This patent application claims the benefit of the priority date of U.S. provisional patent application Ser. No. 61/078,009, filed on Jul. 3, 2008 and entitled Composite Unbalanced Non-Linear Radar pursuant to 35 USC 119. The entire contents of this provisional patent application are hereby expressly incorporated by reference.

TECHNICAL FIELD

The present invention relates generally to radar and, more particularly, to a method and system for producing a difference frequency at a non-linear target using unbalanced radio frequency beams.

BACKGROUND

Non-linear radar (NLR) systems are known. NLR systems use two or more collimated, millimeter wave beams having frequencies that are separated by a difference frequency ($\Delta f$). The difference frequency is usually, although not always, located in the microwave (centimeter wave) range of the electromagnetic spectrum.

Such collimated beams interact when they are brought together. For example, the collimated beams can be brought together at a distant target. Non-linear electrical components such as diodes, transistors, integrated circuits, and detectors, as well as surfaces or structures that have non-linear electrical characteristics (such as due to corrosion, rust, or oxidation) facilitate interaction of the two beams. This interaction causes the production of a difference frequency and harmonics thereof.

By choosing the appropriate $\Delta f$ value or values, it is possible to interact with electronic circuits associated with the target. Such interaction can, for example, interfere with the normal operation of the electronic circuits.

The interaction can occur in various degrees. For example, a mild interaction can cause temporary interference with certain selected functions of the target. More violent interaction can result in the permanent destruction of the target or of its key components or systems.

Most commonly, the level of interaction with the target is determined by the power density delivered to the target. The level of interaction is also determined by how effectively target resonances can be taken advantage of at the target. There is a wide variety of different types of resonances, from electrical resonances created by circuit components, e.g., lumped circuit elements, to electromagnetic resonances produced at microwave frequencies by such structures as cavities, boxes, and instrument cases.

The difference frequency $\Delta f$ can be re-radiated by the target. This re-radiated radio frequency energy can define a radar return that can be used to determine the presence of a device and/or determine the location thereof.

SUMMARY

Systems and methods are disclosed herein to facilitate the production of a difference frequency in a remote target. Production of the difference frequency can be used in non-linear radar applications, for example. The difference frequency can also be use to disrupt the operation of the target. For example, the difference frequency can inhibit the detonation of an improvised explosive device or cause the premature detonation thereof.

More specifically, in accordance with an example of an embodiment, a transmitter system can comprise at least two transmitters that are configured to transmit a plurality of unbalanced radio frequency beams to a target so as to produce a difference frequency in the target.

In accordance with an example of an embodiment, a microwave difference frequency generator can comprise a first transmitter that is configured to provide a first output at a first frequency and a first intensity and a second transmitter that is configured to provide a second output at a second frequency and a second intensity. The second frequency can be different from the first frequency and the second intensity can be different from the first intensity.

In accordance with an example of an embodiment, a non-linear radar system can comprise a first transmitter configured to provide a first output at a first frequency and a first intensity, a second transmitter configured to provide a second output at a second frequency and a second intensity, and a receiver configured to receive an input at a difference frequency of the first and second frequencies. The second frequency can be different from the first frequency and the second intensity can be different from the first intensity.

In accordance with an example of an embodiment, a method for interacting with a target can comprise transmitting at least two unbalanced radio frequency beams to a target so as to produce a difference frequency in the target.

In accordance with an example of an embodiment, a method for exciting a difference frequency in a target having a non-linear component can comprise transmitting a first output at a first frequency and a first intensity to the target and transmitting a second output at a second frequency and a second intensity to the target. The second frequency can be different from the first frequency and the second intensity can be different from the first intensity.

In accordance with an example of an embodiment, a method for practicing non-linear radar can comprise transmitting a first output at a first frequency and a first intensity, transmitting a second output at a second frequency and a second intensity, and receiving an input at a difference frequency of the first and second frequencies. The second frequency can be different from the first frequency and the second intensity can be different from the first intensity.

In accordance with an example of an embodiment, a method for disrupting the operation of a weapon can comprise transmitting a first radio frequency signal at a first frequency and a first intensity to the weapon and simultaneously transmitting a second radio frequency signal at a second frequency and a second intensity to the weapon. The second frequency can be different from the first frequency and the second intensity can be different from the first intensity. The first and second radio frequency signals can interact at a non-linear item, e.g., electronic component, structure, or other item, of the weapon to form a difference frequency that disrupts operation of the weapon.

For example, the first and second radio frequencies signals can be configured to interact at a non-linear item of a bomb, e.g., a roadside bomb or improvised explosive device (IED), in a manner that disables, prematurely detonates, or otherwise inhibits the operation of the bomb.

In accordance with an example of an embodiment, a method for locating an item can comprise transmitting a first output at a first frequency and a first intensity while simultaneously transmitting a second output at a second frequency and a second intensity. The second frequency can be different from the first frequency and the second intensity can be different from the first intensity. An input at a difference frequency of the first and second frequencies can be formed by a non-linearity of the item and the difference frequency can be received so as to provide location information, e.g., direction and distance, for the item.

For example, the first and second radio frequencies signals can be configured to interact at a non-linear part of a tool. As those skilled in the art will appreciate, tools are often formed of materials that define non-linear devices or have structures that define non-linear devices.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Methods and system are disclosed for producing a difference frequency at a non-linear target using unbalanced (having substantially different intensities) radio frequency beams. The difference frequency can be used to alter the operation of a device. For example, the difference frequency can inhibit the operation of a weapon. The difference frequency can provide a radar return so as to indicate presence and/or location of the device.

According to an example of an embodiment, a transmitter system can comprise a higher power transmitter and a lower power that are configured to transmit a pair of unbalanced radio frequency beams to a target so as to produce a difference frequency in the target. The use of a higher power transmitter and a lower power transmitter can reduce cost, size, weight and power consumption as compared to the use of two higher power transmitters. The reduction in size, weight and power consumption can better facilitate airborne and space applications.

According to an example of an embodiment, a transmitter system can comprise at least two transmitters that are configured to transmit a plurality of unbalanced radio frequency beams to a target so as to produce a difference frequency in the target. The transmitter system can comprise two such transmitters or can comprise more that two such transmitters.

According to an example of an embodiment a microwave difference frequency generator can comprise a first transmitter configured to provide a first output at a first frequency and a first intensity and a second transmitter configured to provide a second output at a second frequency and a second intensity. The second frequency can be different from the first frequency and the second intensity can be different from the first intensity.

The first frequency and/or the second frequency can be radio frequencies, such as microwave frequencies. The first frequency and/or the second frequency can be millimeter and/or centimeter wave frequencies. The first frequency and/or the second frequency can be any desired frequencies.

The first intensity can be substantially more than the second intensity. For example, the first intensity can be more than ten times the second intensity. For example, the first intensity can be more than one hundred times the second intensity.

The microwave difference frequency generator can comprise more than two transmitters and each transmitter can transmit a different frequency and/or intensity. Thus, the microwave difference frequency generator can comprise at least one third transmitter, wherein each third transmitter can be configured to provide an output at a frequency that is different from all of the other transmitters and can be configured to provide an intensity that is different from the first intensity.

According to an example of an embodiment, a non-linear radar (NLR) system can comprise a first transmitter configured to provide a first output at a first frequency and a first intensity and a second transmitter configured to provide a second output at a second frequency and a second intensity.

The second frequency can be different from the first frequency and the second intensity can be different from the first intensity. A receiver can be configured to receive an input at a difference frequency of the first and second frequencies.

Such a non-linear radar system can detect the presence of a target having non-linear electronic components and/or non-linear structures. Many targets have such components, as discussed below.

Again, additional transmitters can be used as discuss above and the first and second frequencies and intensities can be varied as also discussed above.

According to an example of an embodiment, a method for interacting with a target can comprise transmitting at least two unbalanced radio frequency beams to a target so as to produce a difference frequency in the target. The difference frequency can be used to affect operation of the target. For example, the difference frequency can adversely affect operation of the target. The difference frequency can provide a radar return. Indeed, the difference frequency can both affect operation of the target and provide a radar return.

According to an example of an embodiment, a method for exciting a difference frequency in a target having a non-linear component can comprise transmitting a first output at a first frequency and a first intensity to the target and simultaneously transmitting a second output at a second frequency and a second intensity to the target. The second frequency can be different from the first frequency and the second intensity can be different from the first intensity.

According to an example of an embodiment, a method for practicing non-linear radar can comprise transmitting a first output at a first frequency and a first intensity while simultaneously transmitting a second output at a second frequency and a second intensity receiving an input at a difference frequency of the first and second frequencies. The second frequency can be different from the first frequency and the second intensity can be different from the first intensity.

According to an example of an embodiment, a method for disrupting the operation of a weapon can comprise transmitting a first radio frequency signal at a first frequency and a first intensity to the weapon while simultaneously transmitting a second radio frequency signal at a second frequency and a second intensity simultaneously to the weapon. The second frequency can be different from the first frequency and the second intensity can be different from the first intensity. The first and second radio frequency signals can interact at a non-linear item of the weapon to form a difference frequency that disrupts operation of the weapon.

For example, the first and second radio frequencies signals can be configured to interact at a non-linear item of a bomb, such as a roadside bomb or improvised explosive device (IED).

According to an example of an embodiment, a method for locating items can comprise transmitting a first output at a first frequency and a first intensity while simultaneously transmitting a second output at a second frequency and a second intensity. The second frequency can be different from the first frequency and the second intensity can be different from the first intensity. An input to a receiver can be received at a difference frequency of the first and second frequencies. The difference frequency can be formed by a non-linearity of the item.

For example, the first and second radio frequencies signals can be configured to interact at a non-linear item of a tool. The receiver can be configured to facilitate the location of tools, such as within or proximate an aircraft under construction or maintenance so as to mitigate the likelihood of damage to the aircraft cause by a lost tool.

Thus, under various non-linear radio frequency mixing conditions it can be desirable to use unbalanced levels, e.g. intensities or powers, to enhance difference frequency generation.

A difference frequency can be produced at a non-linear target in a non-linear millimeter wave radar system using one or more higher power and one or more lower power radio frequency beams. This can be accomplished with comparable efficiency to that of a non-linear radar system using two high intensity beams e.g., beams with comparable power levels. Indeed, weight, volume, power consumption and system cost can potentially be reduced by a factor of almost 2 in some instances. Range can be increased without the penalty of increasing system bulk.

Further, the construction of a portable, e.g., hand carried system with long range functionality can be facilitated. This is possible since the size and weight of the system can be substantially reduced.

In addition, system reliability can be enhanced. Reliability can be enhance because one of the higher power transmitter can be replaced with a more reliable, lower power transmitter.

The formation of a difference frequency from two different frequencies of electromagnetic radiation is discussed in United State patent publication 2002/0017813, published on Jan. 24, 2008 and entitled Composite Dipole Array Systems and Methods and the use of difference frequencies to locate objects at distant locations is discussed in United States patent publication 2006/0109159 published on May 26, 2006 and entitled Method and Apparatus for Detecting, Locating, and Identifying Microwave Transmitters and Receivers at Distant Locations, both of which are hereby expressly incorporated by reference in their entirety.

According to contemporary non-linear radar, two collimated beams, with close to identical beam intensities (and also parallel aligned polarizations) are directed toward a target. By way of contrast, according to an example of an embodiment, one beam has a comparatively high intensity and another beam (with a frequency displaced by a difference $\Delta f$) has a comparatively lower intensity.

Referring now to FIGS. 1-5, Voltage-Current (V-I) diode characteristic charts show the interaction of two radio frequency beams at a non-linear devices or structures (diode-like devices or structures) so as to form a radio frequency signal having a frequency equal to a difference of the frequencies of the two beams.

Figure 1:
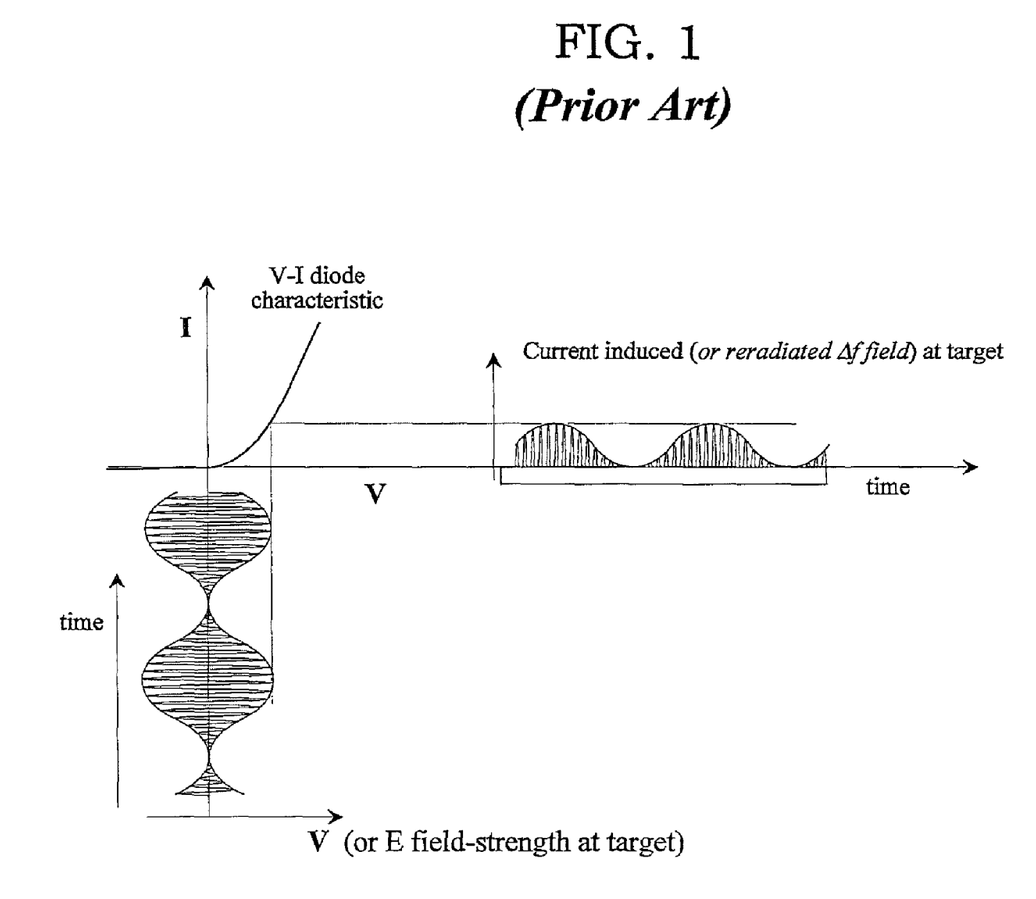
FIG. 1 is Voltage-Current (V-I) diode characteristic chart that shows the response of a zero bias diode to two radio frequency beams of different frequency and approximately equal intensity according to contemporary practice, wherein the incident power is sufficient to induce current at a difference frequency $\Delta f$ at the target.

With particular reference to FIG. 1, the interaction of two radio frequency beams at a high efficiency, zero bias (tunneling) diodes is shown, according to contemporary practice. Such zero bias diodes can be specifically designed for millimeter wave and submillimeter wave operation. They can have extremely low junction capacitance, very low inductance and very low series resistance. Such non-linear circuit components can respond extremely well to low intensity fields when both fields have different frequencies and are of comparable amplitudes, as shown.

These diodes have zero bias characteristics. Thus a very small voltage, e.g., tens of millivolts or less, when applied to the non-linear junction in one direction will result in substantial current flow and when applied in the opposite direction will not result in substantial current flow.

The difference $\Delta f$ component of the current created by the diode will create a radiation field at this same difference frequency $\Delta f$. By using such zero-bias non-linear components it is possible to build one, two and three-dimensional arrays that behave as cooperative targets when illuminated with two separate millimeter or submillimeter wave beams even at great distances.

The sensitivity or responsivity of these arrays can be further enhanced if resonances are built into custom designed structures, referred to as tags. The simplest of such a structure is a 1 dimensional dipole array, also called a composite dipole array (CDA), which is designed to resonate both at the incident millimeter wave beam frequencies and also at the difference frequency $\Delta f$.

Figure 2:
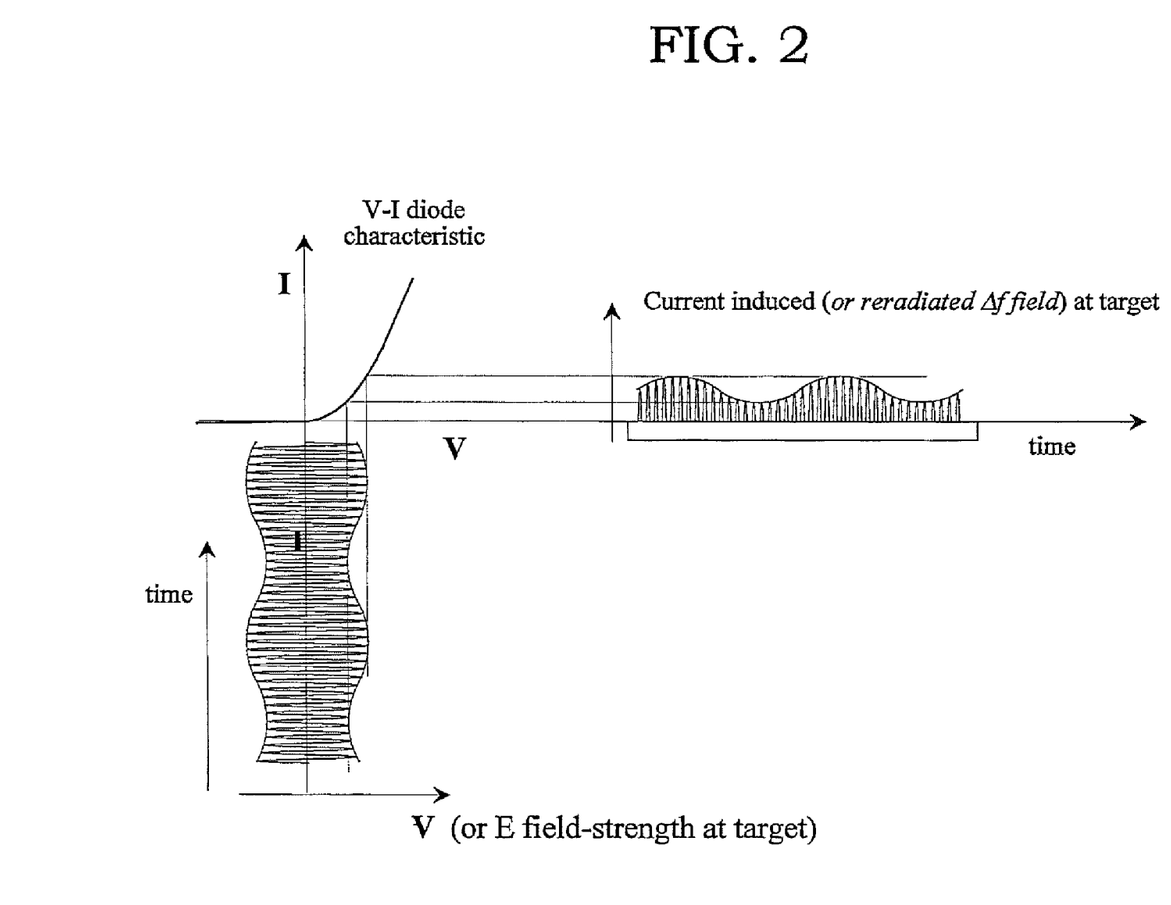
FIG. 2 is Voltage-Current (V-I) diode characteristic chart that shows the response of a zero bias diode to two radio frequency beams of different frequency and unequal intensity according to an example of an embodiment, wherein the incident power is sufficient to induce current at a difference frequency $\Delta f$ at the target.

With particular reference to FIG. 2, a cooperative target, such as a CDA or a higher order array having zero bias diodes is illuminated by two separate millimeter wave beams of unequal, e.g., substantially different, intensities according to an example of an embodiment. The intensity of the reradiated $\Delta f$ depends on the weaker beam's strength and will be reduced to zero as the weaker beam's intensity is reduced to zero.

Figure 3:
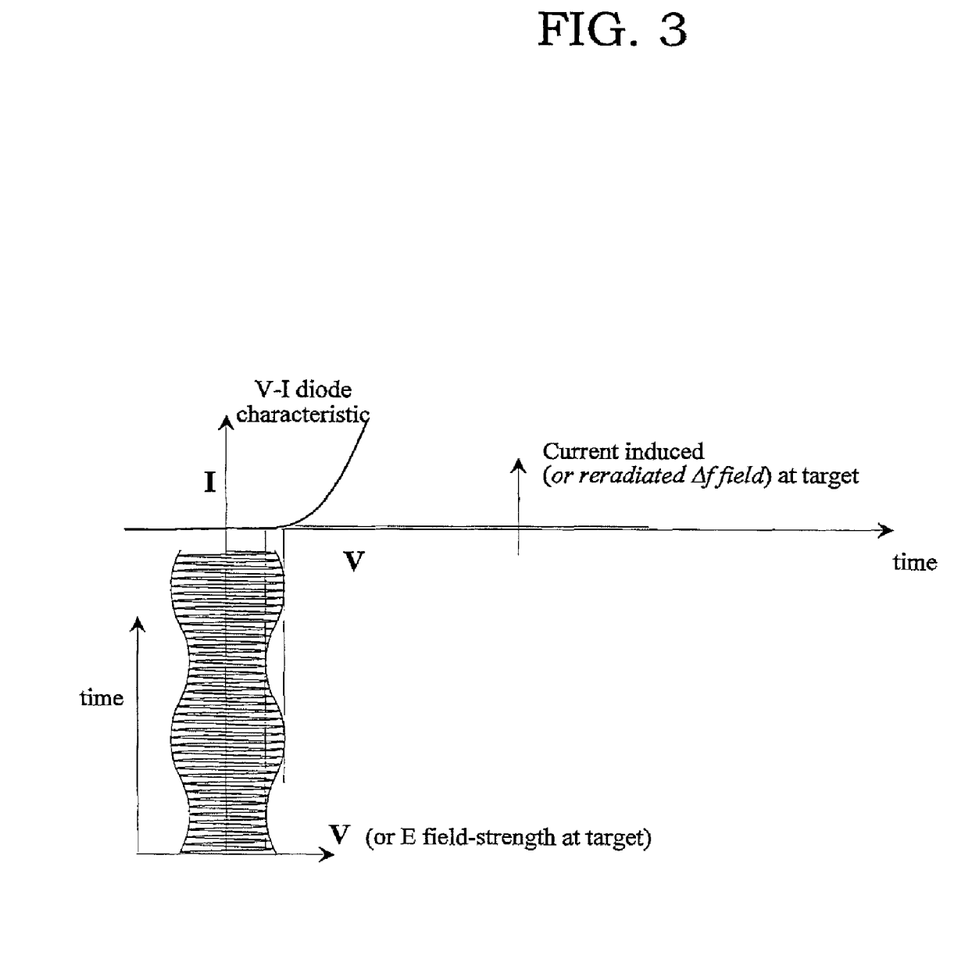
FIG. 3 is Voltage-Current (V-I) diode characteristic chart that shows the response of a non-zero bias diode to two radio frequency beams of different frequency and unequal intensity according to an example of an embodiment, wherein the incident power is insufficient to induce current at a difference frequency $\Delta f$ at the target.

With particular reference to FIG. 3, many non-linear components, even simple everyday diodes, have a finite voltage below which there is no radio frequency current flow. Typical cutoff-voltage values for ordinary diodes, such as Schottky diodes, are in the range of several hundred millivolts to a volt or more. As shown, there is insufficient power in the two beams of unequal intensity to excite the production of a difference frequency $\Delta f$.

A characteristic of a non-linear component's V-I curve is the maximum curvature of the curve. It is also important to note the voltage at which this maximum curvature occurs. If the voltage induced by the incident radio frequency beams is below the cutoff voltage, there will be no current flow in the non-linear component and there will be no reradiated $\Delta f$ field as shown in FIG. 3.

Figure 4:
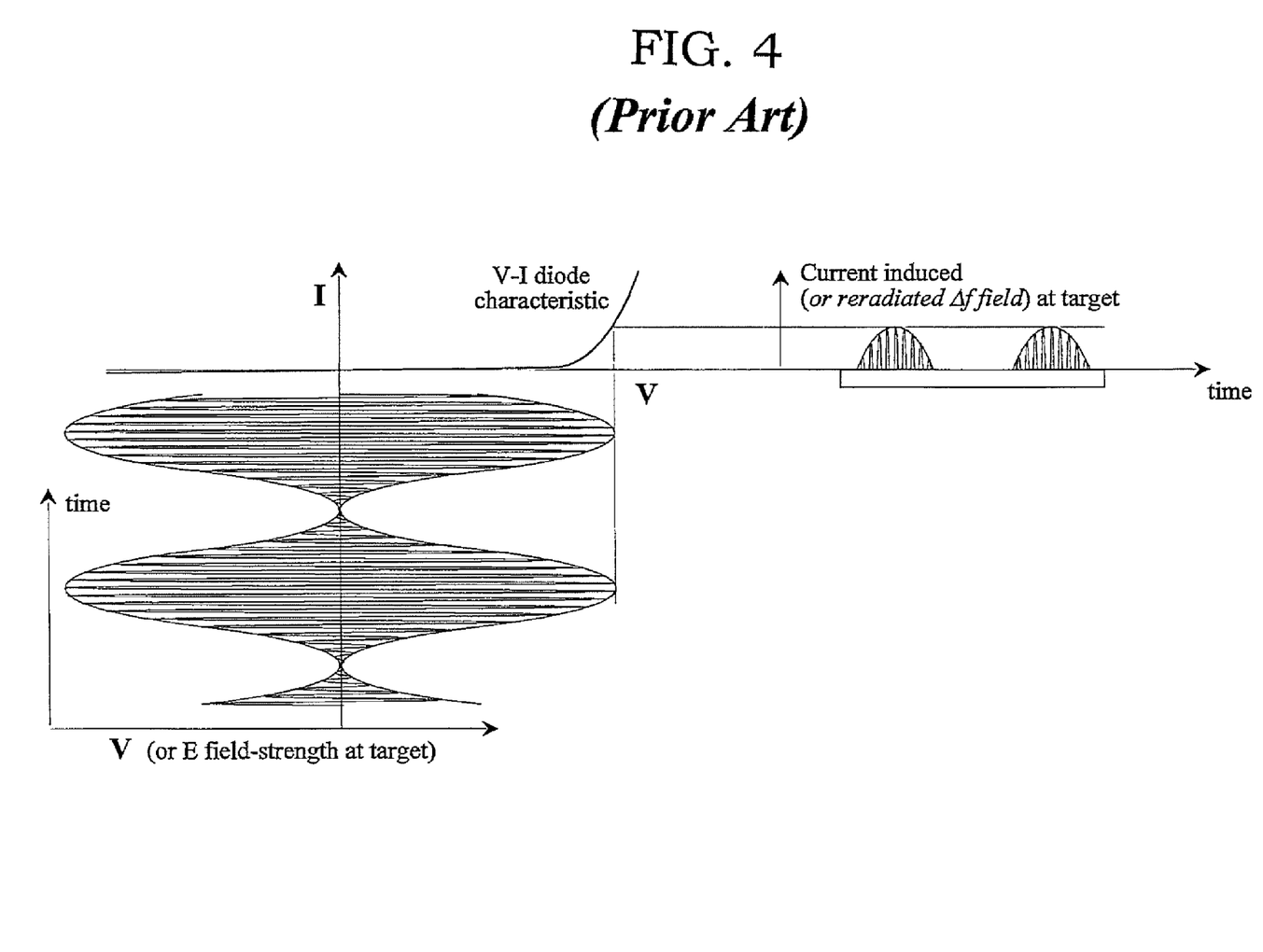
FIG. 4 is Voltage-Current (V-I) diode characteristic chart that shows the response of a non-zero bias diode to two radio frequency beams of different frequency and approximately equal intensity according to contemporary practice, wherein the incident power is sufficient to induce current at a difference frequency $\Delta f$ at the target.

With particular reference to FIG. 4, it is possible to force current to flow in non-linear components with a high cutoff voltage characteristic, such as that in the V-I chart of FIG. 3. This is accomplished by exposing such non-linear components to higher field strengths than the levels needed to turn on a zero-bias diode, for example.

To achieve interaction with such "hardened" non-linear components, especially in the case of long target ranges, it is necessary use high power transmitters, often with outputs in the tens, or even hundreds of watts. FIG. 4 shows such an interaction in the case of two high power millimeter wave beams where both beams carry comparable power or power density.

However, such high power amplifiers are very expensive, heavy, bulky and less reliable than lower power amplifiers. Solid State amplifiers in the W-band are available up to about 4 to 6 watts continuous wave. Amplifiers above such output power levels must generally be vacuum-tube technology based, e.g., klystron type. In addition, anything above several hundred (or perhaps a thousand) watts must be based on a gyrotron type tube with further complications of the need of superconductive magnet and additional complications of the power supply.

As amplifier power is increased, device efficiency also suffers, resulting in increased cooling requirements. All in all, there is significant benefit in having a system that makes works equally well with only a single high power amplifier.

Figure 5:
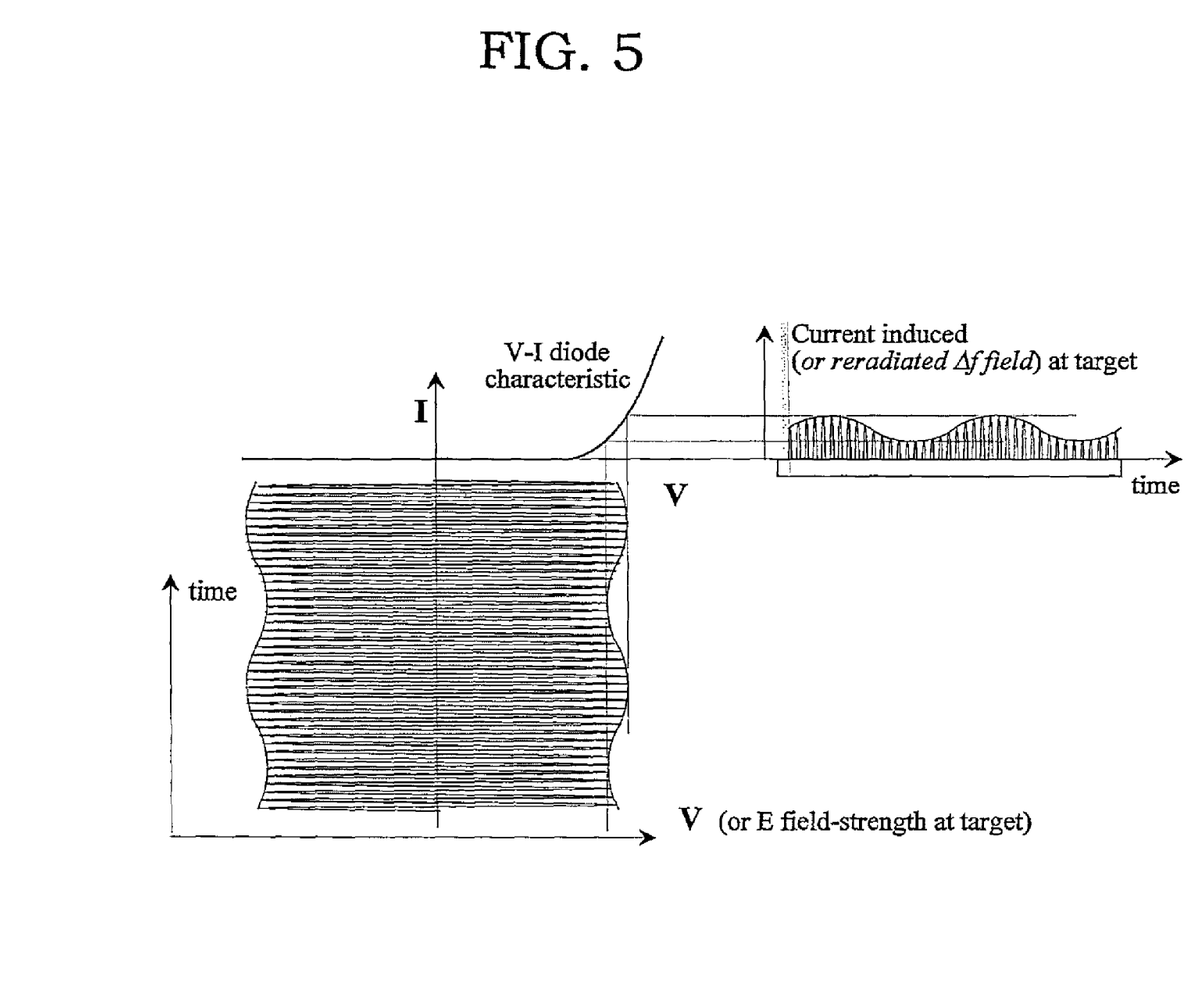
FIG. 5 is Voltage-Current (V-I) diode characteristic chart that shows the response of a non-zero bias diode to two radio frequency beams of different frequency and unequal intensity according to an example of an embodiment, wherein the incident power is sufficient to induce current at a difference frequency $\Delta f$ at the target.

With particular reference to FIG. 5, an example of an embodiment is shown wherein only one high power amplifier is used. It does not matter whether the higher or lower frequency beam is the high power beam.

In many applications it is necessary to provide sufficient power so as to overcome the non-zero bias characteristic shown in FIG. 4. Such applications can include the disruption of the electronics of IEDs and roadside bombs. IEDs and roadside bombs are often made with home-made trigger mechanisms. Such trigger mechanisms can include cell phone armed or IR beam actuated devices, wherein the non-linear components used have high cutoff voltages.

Accordingly, detectors based on non-linear radar (NLR) concepts need to establish high intensity radio frequency fields at the target. Therefore, this concept has major significance, especially in detecting non-linear electronics under difficult conditions when high field-strengths need to be beamed.

It is worthwhile to note that practically all materials behave in a non-linear fashion when driven hard enough. The value of field-strength, such as in terms of volts/meter, is the measure of how hard a non-linear component is driven. The field-strength at the target can be amplified greatly if resonance effects are effectively utilized.

Microwave cavity Q values can easily reach several thousand for metal boxes. Plastic or cardboard boxes on the other hand do not provide resonance enhancement of the fields.

Embodiments can be used to disrupt the operation of remotely located devices. Embodiments can be use to facilitate non-linear radar (ML). Those skilled in the art will appreciate that embodiments are likewise suitable for other applications.

Each transmitter can operate in the W-band (75-100 GHz). Two or more transmitters can be used. One or more transmitters can provide a higher power or intensity output. The other transmitter or transmitters can provide lower power or intensity output.

The output level of one or more transmitters can be variable so as to tend to optimize operation thereof. That is, power can be set to a level that is sufficient to achieve the desired effect (disruption or NLR) without using too much more power than is necessary.

Examples of embodiments can detect and/or locate items, such as IEDs and roadside bombs, that are partially or completely or concealed. For example, IEDs or roadside bombs can be detected that are partially or completely buried.

Figure 6:
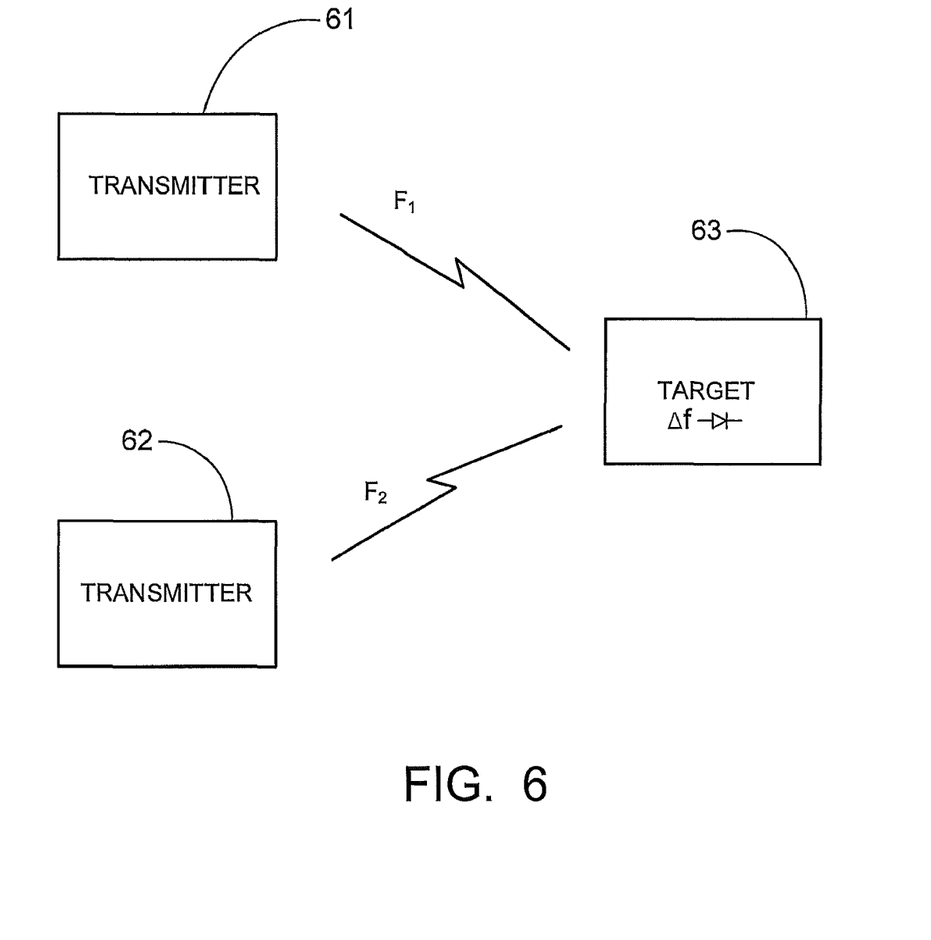
FIG. 6 is a block diagram showing a microwave difference frequency generator wherein two radio frequency beams of different frequency and unequal intensity induce a difference frequency $\Delta f$ at the target, according to an example of an embodiment.

Referring now to FIG. 6, a first transmitter 61 provides a radio frequency signal or beam $F_1$ at a first frequency and a first intensity to a target 63. Similarly, a second transmitter 62 provides a radio frequency signal or beam $F_2$ at a second frequency and a second intensity to the same target 63.

The first frequency and the second frequency are different from one another. The first intensity and the second intensity are substantially different from one another.

The two different signals, $F_1$ and $F_2$ interact in at least one non-linear device or structure of the target 63 to form a difference frequency $\Delta f$. The difference frequency $\Delta f$ can interfere with the normal operation of the target. The frequencies of signals $F_1$ and $F_2$ can be select so as to enhance such disruption, such as by selecting frequencies that are effective in providing such disruption.

Figure 7:
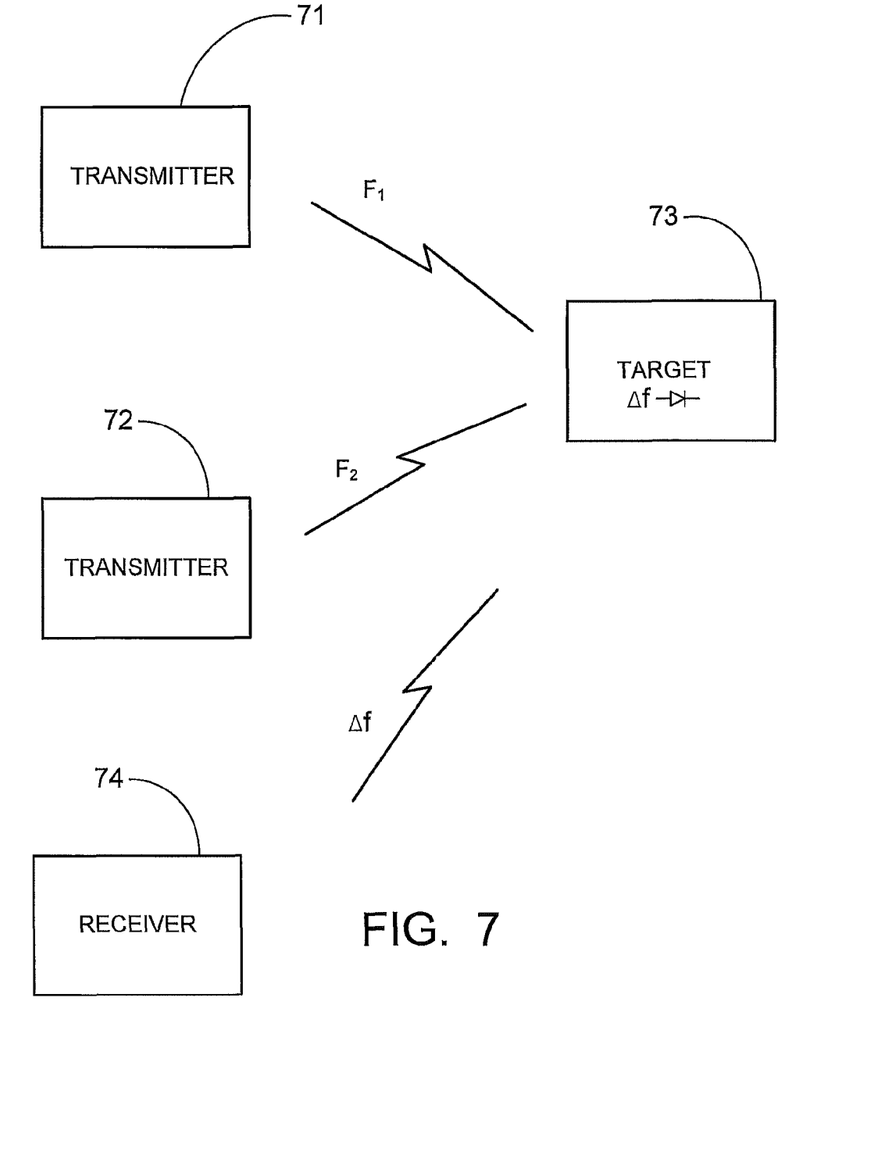
FIG. 7 is a block diagram showing a non-linear radar system wherein two radio frequency beams of different frequency and unequal intensity induce a difference frequency $\Delta f$ at the target and the difference frequency $\Delta f$ produces a re-radiated radio frequency return, according to an example of an embodiment.

Referring now to FIG. 7, the difference frequency $\Delta f$ can define a radar return that can facilitate determining whether or not a target is present and can also facilitate determining the location of the target.

More particularly, a first transmitter 71 provides a radio frequency signal or beam $F_1$ at a first frequency and a first intensity to a target 73. Similarly, a second transmitter 72 provides a radio frequency signal or beam $F_2$ at a second frequency and a second intensity to the same target 73.

A receiver 74 receives the difference frequency $\Delta f$. Contemporary radar methodology can be used to determine the bearing to the target and/or the distance to the target.

Figure 8:
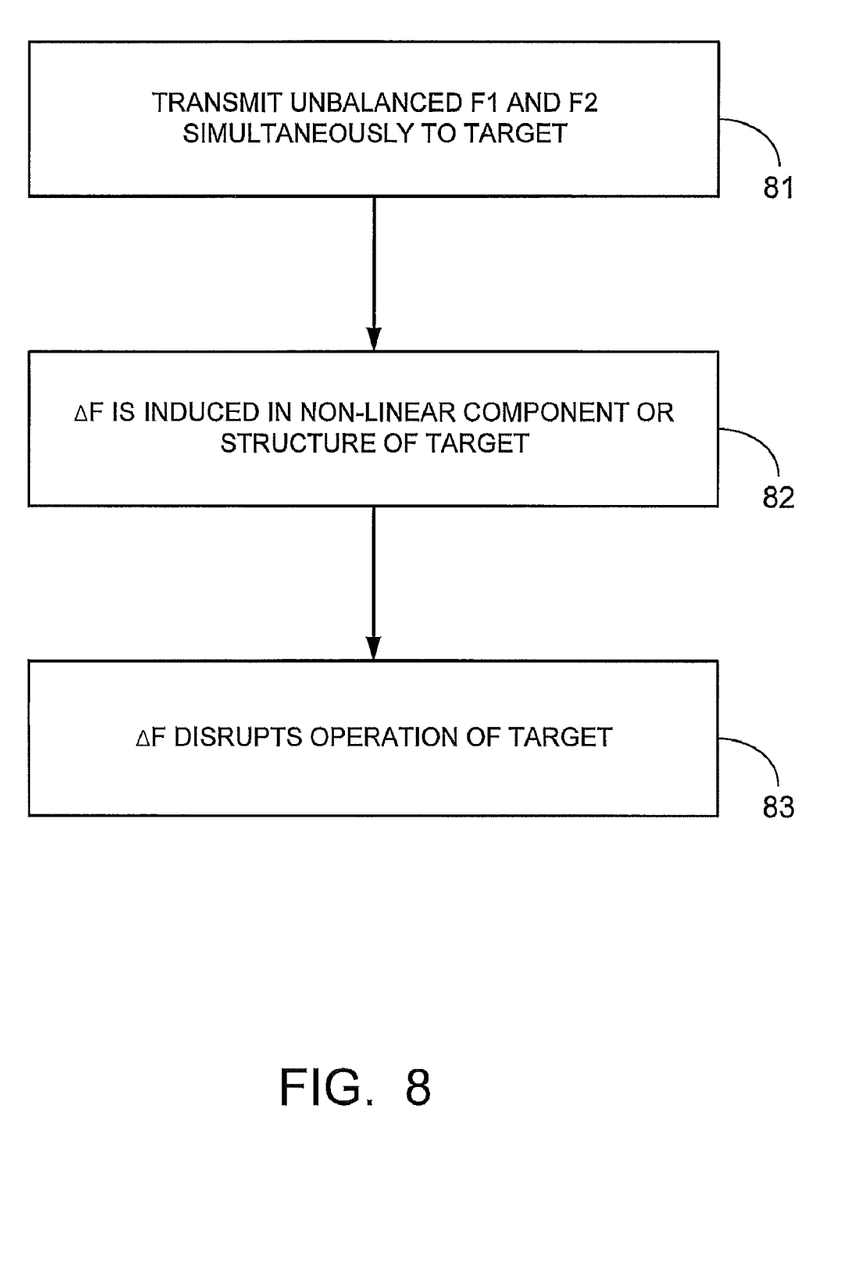
FIG. 8 is a flow diagram showing the use of transmitted radio frequency beams of different frequencies and different intensities to induce a difference frequency $\Delta f$ in a target so as disrupt operation of the target.

Referring now to FIG. 8, a method for disrupting the operation of a target can comprise transmitting unbalance signals or beams $F_1$ and $F_2$ to the target as indicated in block 81. A difference frequency $\Delta f$ can be formed by a non-linear device or structure of the target as indicated in block 82. The difference frequency Δf can effect disruption of the target, as indicated in block 83.

Figure 9:
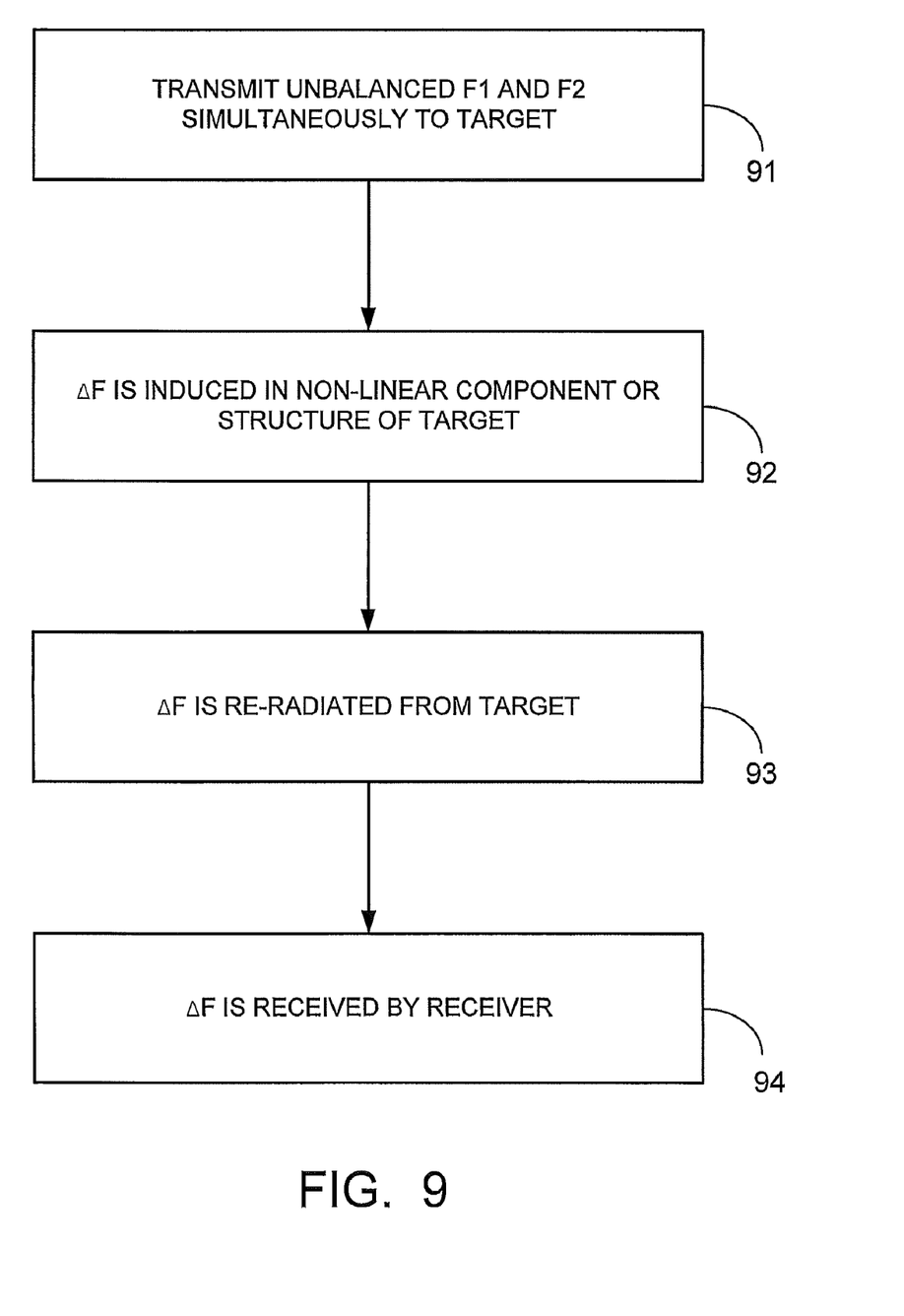
FIG. 9 is a flow diagram showing the use of transmitted radio frequency beams of different frequencies and different intensities to induce a difference frequency $\Delta f$ in a target so as provide a radio frequency radar return.

Referring now to FIG. 9, a method for determining the presence and/or location of a target can comprise transmitting unbalance signals or beams $F_1$ and $F_2$ to the target as indicated in block 91. A difference frequency Δf can be formed by a non-linear device or structure of the target as indicated in block 92.

The difference frequency Δf can be re-radiated by the target so as to define a radar return, as indicated in block 93. The re-radiated difference frequency Δf can be received by a receiver as indicated in block 94.

The term "unbalanced" can be used herein to characterize two or more radio frequency beams that are of unequal intensity. For example, the intensity of one beam can be substantially greater that the intensity(ies) of one or more other beams. For example, the intensity of one beam can be more than tens times the intensity of another beam. For example, the intensity of one beam can be more than one hundred times the intensity of another beam.

The use of a higher power transmitter and a lower power transmitter can reduce costs, size, weight, and power consumption as compared to the use of two higher power transmitters. The reduction in size and weight can better facilitate airborne and space applications.

Embodiments described above illustrate but do not limit the invention. It should also be understood that numerous modifications and variations are possible in accordance with the principles of the present invention. Accordingly, the scope of the invention is defined only by the following claims.

We claim:

1. A transmitter system comprising at least two transmitters that are configured to transmit a plurality of unbalanced radio frequency beams to a cooperative target so as to produce a difference frequency current and re-radiated field in the cooperative target.

2. A microwave difference frequency generator comprising:
a first transmitter configured to provide a first output at a first frequency and a first intensity;
a second transmitter configured to provide a second output at a second frequency and a second intensity, the second frequency being different from the first frequency and the second intensity being different from the first intensity; and
a receiver configured to receive an input from a cooperative target that re-radiates an electric field at a difference frequency of the first and second frequencies.

3. The microwave difference frequency generator as recited in claim 2, wherein the first frequency and the second frequency are radio frequencies.

4. The microwave difference frequency generator as recited in claim 2, wherein the first frequency and the second frequency are microwave frequencies.

5. The microwave difference frequency generator as recited in claim 2, wherein the first intensity is more than ten times the second intensity.

6. The microwave difference frequency generator as recited in claim 2, wherein the first intensity is more than one hundred times the second intensity.

7. The microwave difference frequency generator as recited in claim 2 comprising at least one third transmitter, each third transmitter being configured to provide an output at a frequency that is different from all of the other transmitters and being configured to provide an intensity that is different from the first intensity.

8. A non-linear radar system comprising:
a first transmitter configured to provide a first output at a first frequency and a first intensity;
a second transmitter configured to provide a second output at a second frequency and a second intensity, the second frequency being different from the first frequency and the second intensity being different from the first intensity; and
a receiver configured to receive an input at a difference frequency of the first and second frequencies.

9. The non-linear radar system as recited in claim 8, wherein the first frequency and the second frequency are radio frequencies.

10. The non-linear radar system as recited in claim 8, wherein the first frequency and the second frequency are microwave frequencies.

11. The non-linear radar system as recited in claim 8, wherein the first intensity is more than ten times the second intensity.

12. The non-linear radar system as recited in claim 8, wherein the first intensity is more than one hundred times the second intensity.

13. The non-linear radar system as recited in claim 8 comprising at least one third transmitter, each third transmitter being configured to provide an output at a frequency that is different from all of the other transmitters and being configured to provide an intensity that is different from the first intensity.

14. A method for interacting with a cooperative target, the method comprising transmitting at least two unbalanced radio frequency beams to the cooperative target so as to produce a difference frequency current and re-radiated field in the cooperative target.

15. A method for exciting a difference frequency in a cooperative target having a non-linear component, the method comprising:
transmitting a first output at a first frequency and a first intensity to the cooperative target;
transmitting a second output at a second frequency and a second intensity simultaneously to the cooperative target, the second frequency being different from the first frequency and the second intensity being different from the first intensity; and
receiving an electric field from the cooperative target at a difference frequency of the first and second frequencies.

16. The method as recited in claim 15, wherein the first frequency and the second frequency are radio frequencies.

17. The method as recited in claim 15, wherein the first frequency and the second frequency are microwave frequencies.

18. The method as recited in claim 15, wherein the first intensity is more than ten times the second intensity.

19. The method as recited in claim 15, wherein the first intensity is more than one hundred times the second intensity.

20. A non-linear radar method comprising:
transmitting a first output at a first frequency and a first intensity;
transmitting a second output at a second frequency and a second intensity, the second frequency being different from the first frequency and the second intensity being different from the first intensity; and
receiving an input at a difference frequency of the first and second frequencies.

21. The method as recited in claim 20, wherein the first frequency and the second frequency are radio frequencies.

22. The method as recited in claim 20, wherein the first frequency and the second frequency are microwave frequencies.

23. The method as recited in claim 20, wherein the first intensity is more than ten times the second intensity.

24. The method as recited in claim 20, wherein the first intensity is more than one hundred times the second intensity.

25. A method for locating a weapon, the method comprising:
transmitting a first radio frequency signal at a first frequency and a first intensity to the weapon;
transmitting a second radio frequency signal at a second frequency and a second intensity simultaneously to the weapon, the second frequency being different from the first frequency and the second intensity being different from the first intensity; and
wherein the first and second radio frequency signals interact at a non-linear item of the weapon to form a difference frequency that is reradiated from the weapon; and
receiving the reradiated difference frequency from the weapon.

26. The method as recited in claim 25, wherein the first and second radio frequencies signals are configured to interact at a non-linear item of a roadside bomb.

27. The method as recited in claim 25, wherein the first and second radio frequencies signals are configured to interact at a non-linear item of an improvised explosive device.

28. A method for locating items, the method comprising:
transmitting a first output at a first frequency and a first intensity;
transmitting a second output at a second frequency and a second intensity, the second frequency being different from the first frequency and the second intensity being different from the first intensity; and
receiving an input at a difference frequency of the first and second frequencies, the difference frequency being formed by a non-linearity of the item.

29. The method as recited in claim 28, wherein the first and second radio frequencies signals are configured to interact at a non-linear part of a tool.

* * * * *